UNITED STATES PATENT OFFICE.

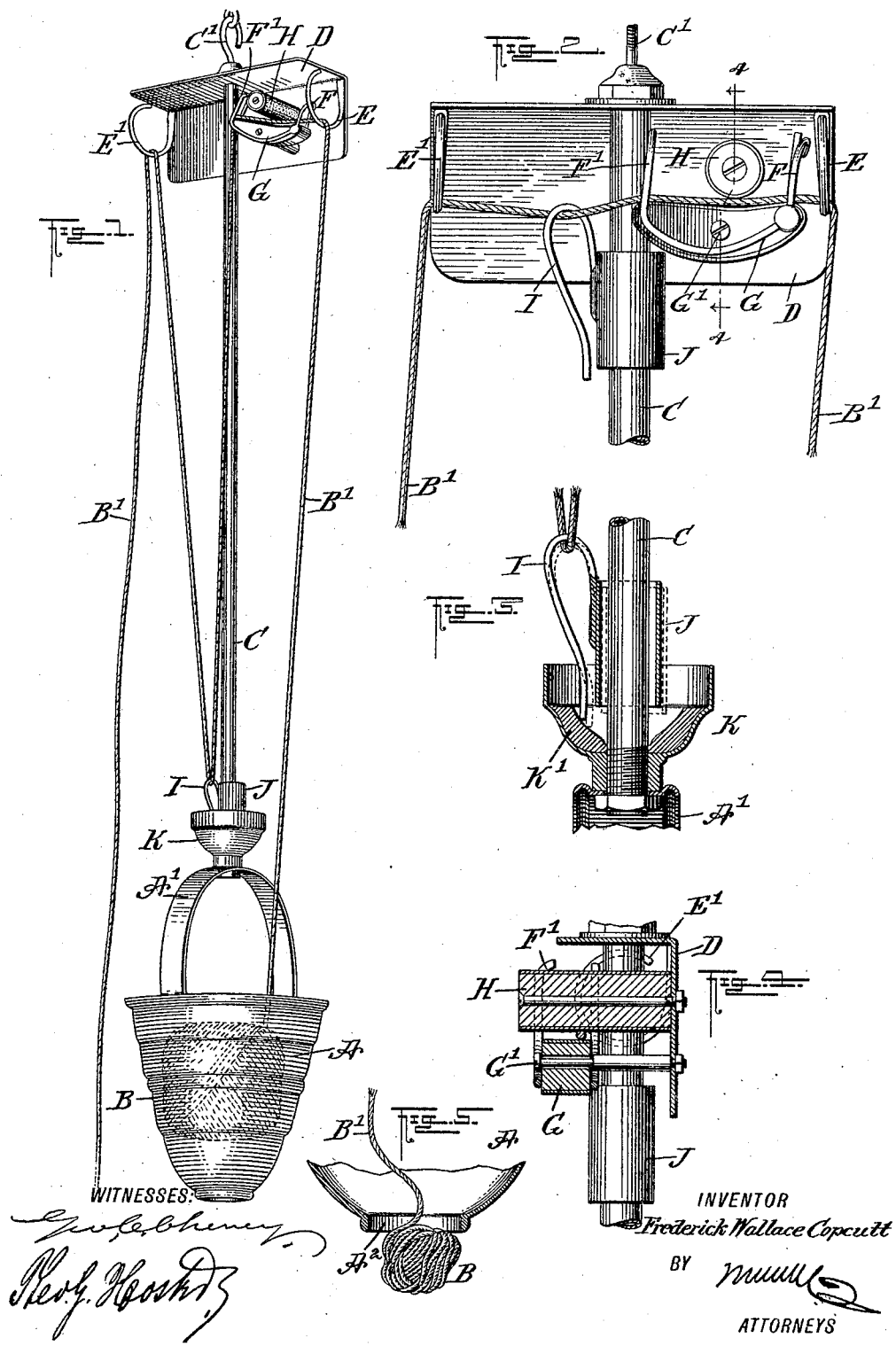

FREDERICK WALLACE COPCUTT, OF NEW YORK, N. Y., ASSIGNOR OF ONE-HALF TO CATHERINE L. COPCUTT, OF NEW YORK, N. Y.

TWINE HOLDER AND TAKE-UP.

No. 819,521.  Specification of Letters Patent.  Patented May 1, 1906.

Application filed August 19, 1904. Serial No. 221,381.

*To all whom it may concern:*

Be it known that I, FREDERICK WALLACE COPCUTT, a citizen of the United States, and a resident of the city of New York, borough of Manhattan, in the county and State of New York, have invented a new and Improved Twine Holder and Take-Up, of which the following is a full, clear, and exact description.

The invention relates to twine-holders and take-ups such as shown and described in the Letters Patent of the United States No. 603,129, granted to me April 26, 1898.

The object of the present invention is to provide a new and improved twine holder and take-up which is very simple and durable in construction, can be readily hung up in any desired place, and is arranged to retract a certain amount of the twine after being released by the operator to remove the end of the twine from the counter.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 1 is a perspective view of the improvement, showing the twine in a relaxed position. Fig. 2 is an enlarged front elevation of the upper end of the improvement, showing the several parts in position when the twine is pulled by the operator. Fig. 3 is a sectional side elevation of the cushion for the sliding weight. Fig. 4 is a transverse section of the improvement on the line 4 4 of Fig. 2; and Fig. 5 is a sectional side elevation of the basket, showing the reduced ball of twine dropping out of the basket.

The basket A for supporting the ball of twine B is provided at its top with a bail A', attached to the lower end of a supporting-rod C, connected at its upper end by a hook C' with a suitable staple or other support located over the counter or other place on which the twine holder and take-up is to be used. On the upper end of the supporting-rod C is secured a frame D, provided on its sides with open-end twine-guides E and E' for the passage of the twine B', unwinding from the ball of twine B, contained in the basket A. The twine B' after it leaves the twine-guide E passes through an open twine-guide F, secured on one end of a lever G, fulcrumed at or near its middle at G' on the frame D, and over the top of this lever G passes the twine B' to permit the lever to clamp the twine against a roller H, journaled on the frame D. The roller H is located directly above one side of the lever G, and the latter is weighted on the side to such an extent that the lever G normally swings into the position shown in Fig. 1 to clamp the twine between the lever and the peripheral face of the roller H. When, however, a pull is exerted on the free end of the twine, then the lever G swings practically into a horizontal position to allow ready passage of the twine between the lever G and the roller H. On the forward end of the lever G is arranged a second open twine-guide F' for guiding the twine from the end of the lever to another twine-guide I in the form of a hook, open at the bottom and secured on a weight J, mounted to slide up and down on the rod C. After leaving this twine-guide I the twine passes through the twine-guide E' previously mentioned and then down to within convenient reach of the operator making use of the twine for tying packages and the like. Normally the weight J is in a lowermost position, as illustrated in Fig. 1, so that the portion of the twine unwinding from the ball of twine B and extending over the lever G is clamped between the latter and the roller H, while the remaining portion of the twine— that is, the part extending from the lever G to the guides I and E'—is in relaxed position. When the weight J is in a lowermost position, the free end of its guide I abuts on the inner beveled face of a cushion K', made of rubber, indurated fiber, or like material, and held within a cup K, secured to the lower end of the rod C, as plainly illustrated in Fig. 3.

When the operator desires to make use of the twine, he pulls on the loose end thereof, and in doing so the weight J is caused to slide upward until the top of its twine-guide I is almost on a level with the top of the lever G, so that a further pull on the free end of the twine causes the twine to unwind from the ball of twine B, as the twine is now unclamped between the lever G and the roller H, as the lever G moves automatically into a horizontal position at the time the weight J moves into an uppermost position, and consequently the twine is unlocked or unclamped between the lever and the roller H. As soon as the operator releases the free end of the cord, after having made use of a desired length for tying packages and the like, then the weight J slides downward and in doing so pulls up by its guide I the loose end of the twine, while the twine portion between the lever G and the roller H is clamped in position between the two and held therein. When the weight J moves into a lowermost position, the free end of its hook-guide I comes in contact with the inner beveled surface of the cushion K', so that the weight J, which is tubular, gradually slides down farther and is pressed against one side of the rod C to prevent the weight from rebounding, and as the lower end of the guide I is in contact with the cushion K' the guide is closed and the thread cannot pass out of it. As shown in the drawings, the several guides are preferably made of wire bent into such form as to be open to allow the operator to conveniently apply the twine in position in the several guides when setting the device up for use.

In the bottom of the basket A is formed an opening A² of sufficient size so that when the ball of twine is reduced and requires renewal then the reduced ball of twine drops through the said opening, (see Fig. 5,) and as the twine is held clamped at the lever G and roller H the twine unwinds itself, and the operator can now readily see the extra dangling end of twine, and is thus notified that a new ball of twine is to be placed in the basket.

From the foregoing it will be seen that the twine holder and take-up is very simple and durable in construction and is composed of comparatively few parts, not liable to get out of order, and the user can readily place the twine in proper position in the several parts to insure the unfailing working of the device as described.

Having thus described my invention, I claim as new and desire to secure by Letters Patent—

1. A twine holder and take-up comprising a basket for the ball of twine, a depending rod for supporting the said basket and provided with a frame having open-end twine-guides, a lever pivoted on the frame, to one side of the said rod, and having twine-guides, a fixed clamp located over the said lever, for the latter to clamp the twine in place, a weight slidable on the said rod and having a twine-guide, open at one end, and a cushioning stop in the path of the weight and having a beveled portion, for the free end of the twine-guide of the weight to abut against, to close the twine-guide.

2. A twine holder and take-up provided with a take-up weight mounted to slide and having an open twine-guide, and a cushioning-stop in the path of the weight and having a beveled portion for the free end of the twine-guide to abut against.

3. In a twine holder and take-up, a rod, a cup on the rod and having a cushion therein, and a weight slidable on the rod and provided with a guide in the form of a hook open at the bottom and whose free end engages the cushion when the weight is in its lowermost position.

4. A twine holder and take-up provided with a weight mounted to slide and having an open twine-guide, and means in the path of the guide for closing the same when the weight reaches the end of its movement.

In testimony whereof I have signed my name to this specification in the presence of two subscribing witnesses.

FREDERICK WALLACE COPCUTT.

Witnesses:
THEO. G. HOSTER,
EVERARD BOLTON MARSHALL.